(12) United States Patent
Mikula et al.

(10) Patent No.: US 6,203,210 B1
(45) Date of Patent: Mar. 20, 2001

(54) FIBER OPTIC CONNECTOR

(75) Inventors: Gary Mikula, Doylestown, PA (US); Rudolf Freiermuth, Grenchen (CH)

(73) Assignee: Wiremold Interlink Cabling System, Broomall, PA (US)

( * ) Notice: Subject to any disclaimer, the term of this patent is extended or adjusted under 35 U.S.C. 154(b) by 0 days.

(21) Appl. No.: 09/293,304

(22) Filed: Apr. 16, 1999

(51) Int. Cl.$^7$ ........................................ G02B 6/36
(52) U.S. Cl. .................... 385/78; 385/72; 385/60
(58) Field of Search .................. 385/78, 53, 59, 385/56, 60, 64, 72, 76, 77, 81, 87, 82, 84, 86, 93

(56) References Cited

U.S. PATENT DOCUMENTS 5,923,804 * 7/1999 Rosson .................................... 385/81

* cited by examiner

*Primary Examiner*—Phan T. H. Palmer
(74) *Attorney, Agent, or Firm*—Akin, Gump, Strauss, Hauer & Feld, L.L.P.

(57) ABSTRACT

A connector for terminating an optical fiber cable includes a ferrule stem assembly, a cap member, and a helical spring. The ferrule stem assembly has first and second opposed ends and a longitudinal passageway defined therethrough. A tab extends radially outwardly from the ferrule stem assembly proximate to the first end. A spring retainer extends radially outwardly from the ferrule stem assembly proximate to the second end. The cap member includes a bore defined longitudinally therethrough. The bore is sized to receive the ferrule stem assembly. An annular lip circumscribes the bore. The cap member is inserted over the ferrule stem assembly such that the tab retains the cap member on the ferrule stem assembly at the annular lip. The helical spring is disposed about the ferrule stem assembly between the ferrule stem assembly and the cap member. The spring is disposed against the spring retainer and biases the annular lip against the tab.

6 Claims, 2 Drawing Sheets

FIBER OPTIC CONNECTOR

BACKGROUND OF THE INVENTION

Optical fiber connectors are commonly used to connect an end of an optical fiber to an end of another fiber to join segments of fiber into longer lengths, or to connect a fiber to a device designed to receive the input provided by the fiber. Optical fiber connectors commonly use ferrule stem assemblies to ensure alignment of fibers to minimize loss of signal between the elements being connected.

One type of optical fiber connector uses ferrule stem assemblies to ensure alignment of fibers in a coupling apparatus where one set of fibers end and another set of fibers begin. One example of a prior art optical fiber connector is shown in FIG. 1. The connector 10 is a four-piece assembly, comprised of a ferrule stem assembly 12, a helical spring 26, a cap 30, and a C-clip 40. The ferrule stem assembly 12 has a first end 14 and a second end 16. The connector 10 is assembled by sliding the helical spring 26 over the first end 14 of the ferrule stem assembly 12. The cap 30 is then slid over the first end 14 of the ferrule stem assembly 12. An annular lip 36 on the inside of the cap 30 engages the spring 26, pushing the spring 26 along the length of the ferrule stem assembly 12 until the spring 26 contacts a spring retainer 24 located on the ferrule stem assembly 12 proximate to the second end 16. The cap 30 is forced along the ferrule stem assembly 12, compressing the spring 26, until the cap 30 clears an annular notch 32 on the outside perimeter of the ferrule stem assembly 12. The C-clip 40 is inserted into the annular notch 32 and the cap 30 is released. The force of the spring 26 biases the annular lip 36 against the C-clip 40, with the C-clip 40 retaining the cap 30 on the ferrule stem assembly 12.

The connector 10 is inefficient to assemble because the cap 30 must be compressed against the spring 26 far enough to expose the annular notch 32. With the annular notch 32 exposed, the C-clip 40 must be inserted into the annular notch 32. The insertion of the C-clip 40 into the annular notch 32 is a delicate process which slows down the manufacture of the connector, resulting in a higher manufacturing cost per connector. It would be advantageous to be able to provide a connector which is more efficient to assemble than prior art connectors, thus lowering the cost of manufacture of the connector. This application discloses a fiber optic connector which provides such advantage.

BRIEF SUMMARY OF THE INVENTION

The invention is a connector for terminating an optical fiber cable and for making a connection with a predetermined coupling apparatus. The connector comprises a ferrule stem assembly which has first and second opposed ends and a longitudinal passageway defined therethrough. The passageway is sized to receive an optical fiber or set of fibers. The ferrule stem assembly further has a tab which extends radially outwardly from the ferrule stem assembly proximate to the first end, and a spring retainer which extends radially outwardly from the ferrule stem assembly proximate to the second end. The connector further comprises a cap member which has a bore defined longitudinally therethrough. The bore is sized to receive the ferrule stem assembly. An annular lip circumscribes the bore. The cap member is inserted over the ferrule stem assembly such that the tab retains the cap member on the ferrule stem assembly at the annular lip. The connector further comprises a helical spring which is disposed about the ferrule stem assembly between the ferrule stem assembly and the cap member. The spring is disposed against the spring retainer and biases the annular lip against the tab.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
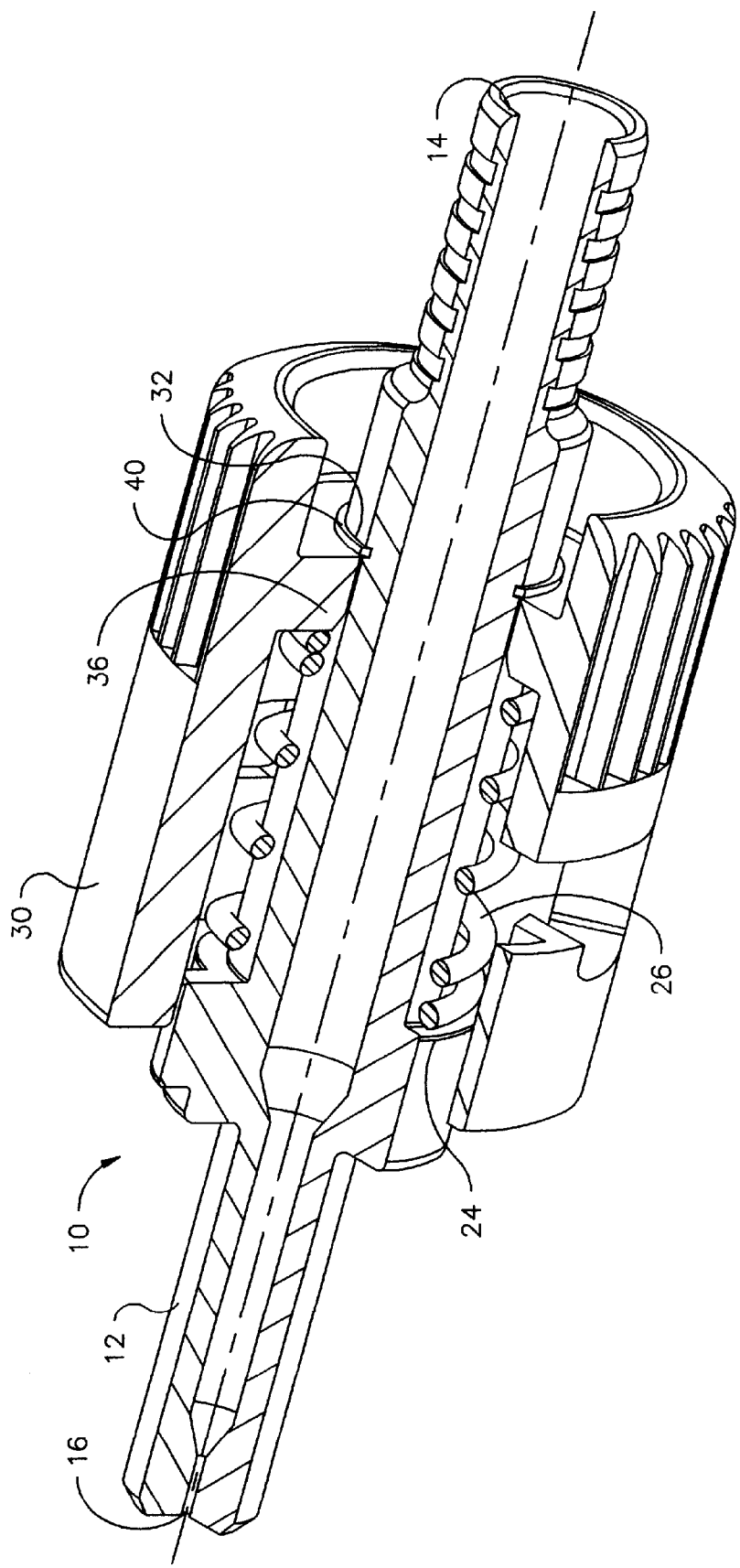
FIG. 1 is a perspective view, partially in section, of a prior art fiber optic connector.
Figure 2:
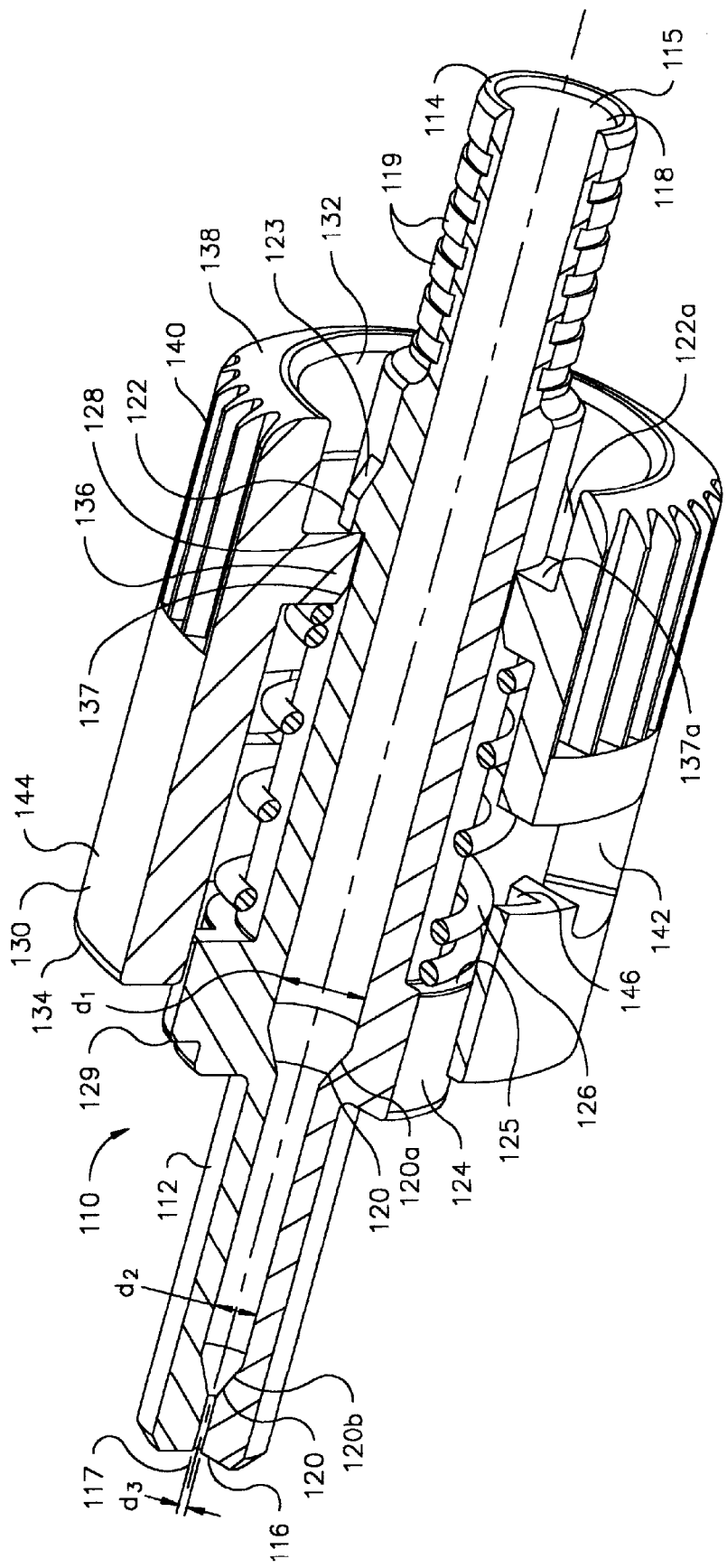
FIG. 2 is a perspective view, partially in section, of the fiber optic connector of the present invention.

In the drawings, like numerals are used to indicate like elements throughout. FIG. 2 shows a perspective view, partially in section, of a connector for terminating an optical fiber and for making a connection with a predetermined coupling apparatus, generally indicated at 110. The coupling apparatus (not shown) may couple one fiber optic connector 110 to another fiber optic connector 110, or the coupling apparatus may couple one fiber optic connector 110 to an operating device, such as a repeater, a switch, or an attenuator, although those skilled in the art will realize that other devices not listed may be used. Those skilled in the art will also realize that the coupling apparatus itself may be any other device designed to accept the fiber optic connector 110.

The connector 110 comprises a ferrule stem assembly 112 which has a first end 114. The first end 114 has a preferably circular opening 115, approximately 2 millimeters in diameter. The circular opening 115 is sized to allow a technician to insert an end of an optical fiber (not shown), its outer coating having been stripped, into the first end 114 without much difficulty. The ferrule stem assembly 112 also has a second opposed end 116 which has a preferably circular opening 117, slightly larger in diameter than a single standard optical fiber diameter, or about 0.128 millimeters.

A longitudinal passageway 118 is defined through the ferrule stem assembly 112. Preferably, the ferrule stem assembly 112 extends generally longitudinally along the longitudinal passageway 118, although those skilled in the art will understand that the ferrule stem assembly 112 may have other shapes or dimensions. The passageway 118 is sized to receive an optical fiber which is inserted into the passageway 118 from the first end 114. At least a portion of the passageway 118 has a taper 120. The taper 120 slopes radially inward from a first diameter d, to a decreasingly smaller diameter in a direction along the ferrule stem assembly 112 toward the second end 116. Preferably, the taper comprises a first tapered portion 120a which decreases from the first diameter $d_1$ to a second diameter $d_2$, and a second tapered portion 120b which decreases from the second diameter $d_2$ to a third diameter $d_3$. However, those skilled in the art will realize that one continuous taper or more than two discrete tapers can be used to reduce the diameter of the passageway 118 from the first diameter $d_1$ to the third diameter $d_3$. The third diameter $d_3$, located at opening 117, is slightly larger than the diameter of an optical fiber whose outer coating has been removed so that the fit between the fiber and the opening 117 is typically no tighter than a sliding fit. Annular ridges 119 are located on the outer perimeter of the first end 114 of the ferrule stem assembly 112.

A first tab 122 extends radially outwardly from the ferrule stem assembly 112 proximate to the first end 1 14. The first tab 122 comprises a beveled shoulder 123 located proximate to the first end 114 and a flat shoulder 128 located distal from the first end 114. Preferably, a second, identical tab 122a extends transversely from the ferrule stem assembly 112 proximate to the first end 114. Preferably, the second, identical tab 122a is radially opposed from the first tab 122 to accommodate industry standards.

A spring retainer 124 extends radially outwardly from the ferrule stem assembly 112 proximate to the second end 116, preferably proximate to the first taper 120a. Preferably, the spring retainer is annularly shaped and has a flat shoulder 125 located distal from the second end 116. Preferably, the spring retainer extends completely around the ferrule stem assembly 112. A key 129 is located on the spring retainer 124, extending transversely from the passageway 118. The ferrule stem assembly 112 is preferably made from a liquid crystal polymer, although those skilled in the art will realize that other materials may be used. A helical spring 126 is sized to fit over the ferrule stem assembly 112.

Referring still to FIG. 2, a cap member 130 has a bore 132 defined longitudinally therethrough. The cap member 130 has a first end 134 and a second end 138. The bore 132 is sized to receive the ferrule stem assembly 112 from the first end 134 of the cap 130. An annular lip 136 circumscribes the bore 132 proximate to the second end 138 of the cap member 130. The annular lip 136 includes a beveled shoulder 137 located proximate to the first end 134 of the cap member 130 and a flat shoulder 137a located distal from the first end 134 of the cap member 130.

The cap member 130 includes a pair of radially opposed, generally L-shaped notches 142 located proximate to the first end 134. Each L-shaped notch 142 extends from the outer surface 144 of the cap member 130 to the bore 132. Two radially opposed, generally rectangular notches 146 are located at the first end 134 of the cap member 130 and extend from the bore 132 partially through the cap member 130, but do not extend to the surface 144. Each rectangular notch 146 extends longitudinally from the first end 134 and terminates at one of the radially opposed L-shaped notches 142, forming a channel for insertion of a twist-and-lock device of a coupling apparatus, to be discussed later herein.

The cap member 130 preferably has a knurled surface 140 located on an outer surface 144 of the cap member 130 proximate to the second end 138. The knurled surface 140 provides a better gripping surface for twisting the cap member 130 to lock/unlock the connector 110 to/from the twist-and-lock device on the coupling apparatus. The cap member 130 is preferably made from Lexan®, although those skilled in the art will realize that other materials may be used.

The assembly of the fiber optic connector 110 will now be discussed. The helical spring 126 is inserted over the ferrule stem assembly 112 from the first end 118, and is slid along the length of the ferrule stem assembly 112 until the spring 126 encounters the spring retainer 124 at the spring retainer shoulder 125. The first end 134 of the cap member 130 is inserted over the first end 118 of the ferrule stem assembly 112 and slid along the length of the ferrule stem assembly 112. The beveled shoulder 123 of the first tab 122 and the beveled shoulder 137 of the cap member 130 engage each other. The beveled shoulders allow the annular lip 136 to travel up and over the first tab 122 as the cap member 130 is slid along the ferrule stem assembly 112. The beveled shoulder 137 of the annular lip 136 traverses the first tab 122 over the beveled shoulder 123 of the first tab 122 and past the flat shoulder 128 of the first tab 122, such that the first tab 122 retains the cap member 130 on the ferrule stem assembly 112 at the annular lip 136. Once the annular lip 136 traverses the flat shoulder 128 of the first tab 122, the flat shoulder 128 of the first tab 122 and the flat shoulder 137a of the cap member 130 prevent the annular lip 136 from traveling over the first tab 122 toward the first end 114, thereby locking the cap member 130 onto the ferrule stem assembly 112. It is obvious to one of ordinary skill in the art that any additional tabs which may be located on the ferrule stem assembly 112 are located such that the second tab 122a retains the cap member 130 on the ferrule stem assembly 112 at the annular lip 136.

As the cap member 130 is inserted over the ferrule stem assembly 112, the helical spring 126, disposed about the ferrule stem assembly 112 between the ferrule stem assembly 112 and the cap member 130, is biased and compressed against the spring retainer lip 124a of the spring retainer 124 by the annular lip 136 of the cap member 130. After the annular lip 136 is inserted over the complete length of the first tab 122, the cap member 130 is released. Part of the mechanical energy stored in the helical spring 126 during its compression is released, forcing the flat shoulder 137a of the annular lip 136 against the flat shoulder 128 of the first tab 122. The remaining energy stored in the helical spring 126 remains in the helical spring 126, biasing the flat shoulder 137a of the annular lip 136 against the flat shoulder 128 of the first tab 122.

The use of the assembled fiber optic connector will now be described. The optical fiber which is to be connected is stripped of its outer coating sufficiently to reveal a length of fiber approximately slightly longer than the length of the ferrule stem assembly 112. A strain-relief boot (not shown), preferably manufactured from Santoprene® elastomer or some other rigid elastomer known to those skilled in the art, is slid over the exposed fiber and further slid over the beginning of the remaining outer coating. Epoxy or some other adhesive known to those skilled in the art is applied to the exposed fiber. The fiber is inserted into the fiber optic connector 110 from the first end 114. The fiber is then pushed through the fiber optic connector 112. As the fiber is pushed through the fiber optic connector, the decreasing diameter of the passageway 118 from the first diameter $d_1$ to the third diameter $d_3$ forces the fiber to the longitudinal center of the longitudinal passageway 118 and to the opening 117 in the second end 116. The fiber is inserted far enough into the connector 110 so that the fiber emerges from the second end 1 16. After the adhesive is cured, the exposed part of the fiber at the second end 116 is removed by a method known in the art, ensuring a clean face on the fiber at the second end 116.

After the fiber is installed in the connector 110, the boot is slid over the annular ridges 119 so that part of the boot "locks" onto the connector 110 at the annular ridges 119. A remainder of the boot remains over the outer coating. The boot serves to relieve strain on the end of the fiber at the connector 110, limiting the bend radius of the fiber and reducing the possibility of the fiber breaking at the first end of the connector 110.

The second end 116 of the connector 110 is connected to the coupling apparatus (not shown). The coupling apparatus connects the fiber optic connector 110 to another element, such as another connector 110 or a device as described above.

To connect the connector 110 with the coupling apparatus, the second end 116 is inserted into a receiver the coupling apparatus which is designed to accept the second end 116. The coupling apparatus has a notch located thereon to accept the key 129 of the ferrule stem assembly 112. The key 129 locates the ferrule stem assembly 112 in the coupling apparatus, and prevents the ferrule stem assembly 112 from rotating with respect to the coupling apparatus once the ferrule stem assembly 112 is inserted into the coupling apparatus. The coupling apparatus has a twist-and-lock assembly (not shown), which is known in the art. Notches 142, 146 of the cap member 130 engage with the twist-and-lock assembly, releasably locking the connector 110 to the coupling apparatus. The helical spring 126, acting against the cap member 130 as described above, serves to retain the cap member 130 on the twist-and-lock assembly.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A connector for terminating an optical fiber cable and for making a connection with a predetermined coupling apparatus, comprising:

a ferrule stem assembly having first and second opposed ends and a longitudinal passageway defined therethrough, the passageway being sized to receive an optical fiber, a first tab extending radially outwardly from the ferrule stem assembly proximate to the first end, and a spring retainer extending radially outwardly from the ferrule stem assembly proximate to the second end;

a cap member having a bore defined longitudinally therethrough, the bore being sized to receive the ferrule stem assembly, and an annular lip circumscribing the bore, the cap member being inserted over the ferrule stem assembly such that the first tab retains the cap member on the ferrule stem assembly at the annular lip; and a helical spring being disposed about the ferrule stem assembly between the ferrule stem assembly and the cap member, the spring being disposed against the spring retainer and biasing the annular lip against the first tab.

2. The connector according to claim 1, wherein the ferrule stem assembly is made from a liquid crystal polymer.

3. The connector according to claim 1, further comprising a second tab extending transversely from the ferrule stem assembly proximate to the first end such that the second tab retains the cap member on the ferrule stem assembly at the annular lip.

4. The connector according to claim 3, wherein the second tab is radially opposed from the first tab.

5. The connector according to claim 1, wherein the first tab has a beveled shoulder located proximate to the first end.

6. The connector according to claim 1, wherein at least a portion of the passageway is tapered, the tapered portion thereof sloping radially inward from a first diameter to a decreasingly smaller diameter in a direction along the ferrule stem assembly toward the second end.

\* \* \* \* \*